(12) United States Patent
Chandu et al.

(10) Patent No.: US 8,412,055 B2
(45) Date of Patent: Apr. 2, 2013

(54) AUTOMATIC PAPER MANAGEMENT AND COLOR PROFILE UTILIZATION

(75) Inventors: Kartheek Chandu, Longmont, CO (US); Mikel J. Stanich, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 355 days.

(21) Appl. No.: 12/780,526

(22) Filed: May 14, 2010

(65) Prior Publication Data

US 2011/0280589 A1 Nov. 17, 2011

(51) Int. Cl.
G03G 15/00 (2006.01)
(52) U.S. Cl. .................. 399/15; 399/45; 399/49
(58) Field of Classification Search .............. 399/8, 15, 399/39, 45, 49, 389
See application file for complete search history.

(56) References Cited

U.S. PATENT DOCUMENTS

| | | | |
|---|---|---|---|
| 5,457,541 A | 10/1995 | Burns | |
| 7,068,380 B2 | 6/2006 | Milton et al. | |
| 7,095,529 B2 | 8/2006 | Krueger | |
| 7,145,677 B2 | 12/2006 | Shimbori et al. | |
| 7,152,941 B2 | 12/2006 | Johnson | |
| 7,163,269 B2 | 1/2007 | Levine | |
| 7,203,434 B2 * | 4/2007 | Nakayama | 399/49 |
| 7,554,694 B2 | 6/2009 | Itagaki | |
| 7,599,634 B2 | 10/2009 | Kuo et al. | |
| 2004/0021879 A1 | 2/2004 | Castelltort | |
| 2005/0094209 A1 | 5/2005 | Hasler et al. | |
| 2007/0139733 A1 | 6/2007 | Mizes et al. | |
| 2008/0291498 A1 * | 11/2008 | Yano et al. | 358/3.1 |

OTHER PUBLICATIONS

"Onyx Production House"; ONYX Graphics Inc; 2007, http://www.tubeliteocom/docs/products/digitaysoftware/7.0_PHouseprochure.pdf.
"User Provided Input to Determine ICC Profile Subset"; IBM; Nov. 13, 2006, http://www.ip.com/pubview/IPCOM000143148D.
"Custom ICC destination profile update notification and synchronization service"; Sep. 20, 2007, http://www.ip.com/pubview/IPCOM000158479D.

* cited by examiner

Primary Examiner — Sandra Brase
(74) Attorney, Agent, or Firm — Duft Bornsen & Fettig, LLP (57) ABSTRACT

Methods and systems herein provide for calibration of a production printing system that accommodates a plurality of different print paper types, including new paper types with no ICC profiles or optical density curves on file. One exemplary method includes printing test patches of primary colors on a first print medium, measuring colors of the test patches printed on the first print medium to determine an optical density of the first print medium, and comparing the optical density of the first print medium to a plurality of optical density curves to identify a comparable optical density curve of a different print medium. The comparable optical density curve is one of a plurality of optical density curves installed on the production printing system. The method further includes automatically selecting the comparable optical density curve to calibrate the production printing system to the different print medium for use in printing to the first print medium.

18 Claims, 6 Drawing Sheets

AUTOMATIC PAPER MANAGEMENT AND COLOR PROFILE UTILIZATION

BACKGROUND

1. Field of the Invention

The invention relates to the field of production printing systems and, in particular, to calibrating printers that print to a plurality of different print mediums (e.g., different types of paper).

2. Statement of the Problem

Production printing systems associated with data processing enterprises generally include a localized print controller within the printing system. The print controller controls the overall operation of the printing system including, for example, host interfacing, interpretation or rendering, and lower level process control or interface features of print engines of the printing system. Host interaction may include appropriate adapters for coupling the printing system to one or more host systems that transmit print jobs to the printing system. The print jobs are generally encoded in the form of a page description language such as PostScript (PS), PCL, AFP, etc.

In whatever form the print job may be encoded or formatted, the print controller within the printing system interprets the received information to generate sheetside bitmaps of the print job. The sheetside bitmaps represent the image to be printed on one side of a sheet of a print medium. Each sheetside bitmap generally comprises a 2-dimensional array of picture elements ("pixels", or PELs) that represent a corresponding formatted sheet of the print job. Each pixel may represent an encoded color value in accordance with the requirements of the particular print job encoding and the capabilities of the printing system on which the print job is to be printed.

The print controller stores or buffers the sheetside bitmaps in accordance with storage capabilities of the particular architecture of a particular print controller. The print controller then forwards the sheetside bitmaps to one or more print engines (sometimes also referred to as an "imaging engine" or as a "marking engine"). The print engines have internal queues for storing the sheetside bitmaps to be printed. A print engine pulls the sheetside bitmaps off of the queue and performs an imaging process to mark the print medium with the sheetside bitmaps provided by the print controller. The print engine may comprise a laser print engine, an ink-jet print engine, or another type of imaging system that transfers each sheetside bitmap to corresponding pixels on the print medium.

Output quality for the printer generally depends on the print engine characteristics being known and fixed, so that the color conversions and transfer curves can be constructed in advance. This known state may be referred to as the reference state. Periodically, the printer is calibrated so as to maintain print quality. Printer calibration involves printing a set of test patches where the output is known assuming that the printer is in the reference state. The printed patches are then measured and compared to the known values for the reference state of the printer to determine a model of the printer drift. This model is then used to adjust the transfer curves (e.g., color conversion models) used for printing such that subsequent output can be corrected to appear the same as that of the printer in the reference state. Most printer manufacturers offer various calibration techniques to customers. For example, the "InfoPrint Manager" contains a halftone calibration system that allows the user to print test patches, measure the patches using an optical densitometer, and then recalibrate the printer using a single measurement set. This system is generally based on a single paper type.

A calibration system generally accounts for each print job using a variety of different paper types with each paper type behaving quite differently from another. Typically, different ICC (International Color Consortium) profiles are created for different papers to obtain the same image quality for each different paper. In doing so, an ICC profile is generated by a printer manufacturer in advance on a stable printer with the resident halftones for a particular paper type, generally referred to as a "reference paper". The associated ICC profile is thus called a "reference ICC profile". When a reference ICC profile is created for a paper, the optical density characteristics and maximum target optical density on that paper (i.e., the "reference paper data") are stored along with the reference ICC profile. However, in high-speed color production printers, a variety of papers are used in different print jobs at any given time. In some cases, the same print job is even printed on different papers (e.g., due to location). Thus, certain paper types may not be available or known to the printer manufacturer. Accordingly, the calibration system may be configured to allow end users to support any new paper type. But, such results in significant downtime and loss of productivity due to the time involved in creating multiple reference ICC profiles for so many different possible paper types in an inventory. Additionally, an operator may select the wrong profile for a paper, often resulting in reprinting and the further loss of productivity and wasted supplies, such as ink and paper. Accordingly, there exists a need to calibrate a printer for a variety of paper types that automatically assures the paper being printed has a relatively accurate transfer curve and proper ICC profile associated therewith.

SUMMARY

Embodiments described herein provide a calibration process for a production printing system that accommodates a plurality of different print paper types, including new paper types with no ICC profiles or optical density curves on file. In this regard, a calibration module of the production printing system either automatically selects the closest existing reference ICC profile for a new paper or creates a new set of halftones such that the new paper may use the existing reference ICC profile.

In one embodiment, a method of calibrating a high-speed production printing system includes printing test patches of primary colors on a first print medium, measuring colors of the test patches printed on the first print medium to determine an optical density of the first print medium, and comparing the optical density of the first print medium to a plurality of optical density curves to identify a comparable optical density curve of a different print medium. The comparable optical density curve is one of a plurality of optical density curves installed on the production printing system. For example, a manufacturer may generate a plurality of optical density curves and associated ICC profiles for each paper type that may be printed on the production printing system. These optical density curves and ICC profiles are persistently stored with the printing system for use in calibrating the printing system to a particular paper type. However, when a new print medium is added to the printing system for which no optical density curve or ICC profile exists, the production printing system automatically selects the comparable optical density curve to calibrate the printing system to the different print medium. In other words, the optical density curve may not match the optical density of the new print medium. However, a comparable optical density curve from those stored within the printing system may be used in its place.

The method may further include selecting a color profile (e.g., an ICC color profile) associated with the different print medium and directing the production printing system to print to the first print medium based on the selected color profile. The method may also include receiving a new optical density curve and a new color profile (e.g., a new ICC color profile) corresponding to another different print medium and automatically calibrating the production printing system based on the new optical density curve. The method may also include selecting the comparable optical density curve according to an optical density of the corresponding print medium. In this regard, the comparable optical density curve has less maximum optical density than the first print medium.

In another embodiment, a high-speed production printing system includes a print engine operable to print image data of a print job on a first print medium and a storage module operable to store a plurality of optical density curves corresponding to a plurality of print mediums. The print mediums differ from the first print medium. Each optical density curve is operable to calibrate the print engine to convert color values of the image data to a color space of the print engine based on a corresponding print medium. The printing system also includes a measurement module operable to measure color values of test patches print on the first print medium to determine an optical density of the first print medium. The printing system also includes a calibration module operable to compare the optical density of the first print medium to the optical density curves of the storage module, select a comparable optical density curve from the plurality of optical density curves, and automatically calibrate the print engine based on the comparable optical density curves.

The various embodiments disclosed herein may be implemented in a variety of ways as a matter of design choice. The embodiments may take the form of hardware, software, firmware, or combinations thereof. In one embodiment, a computer readable medium is operable to store software instructions for calibrating a high-speed production printing system to a plurality of different paper types. These software instructions are configured to direct a print controller of the production printing system to operate in the manner described above.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
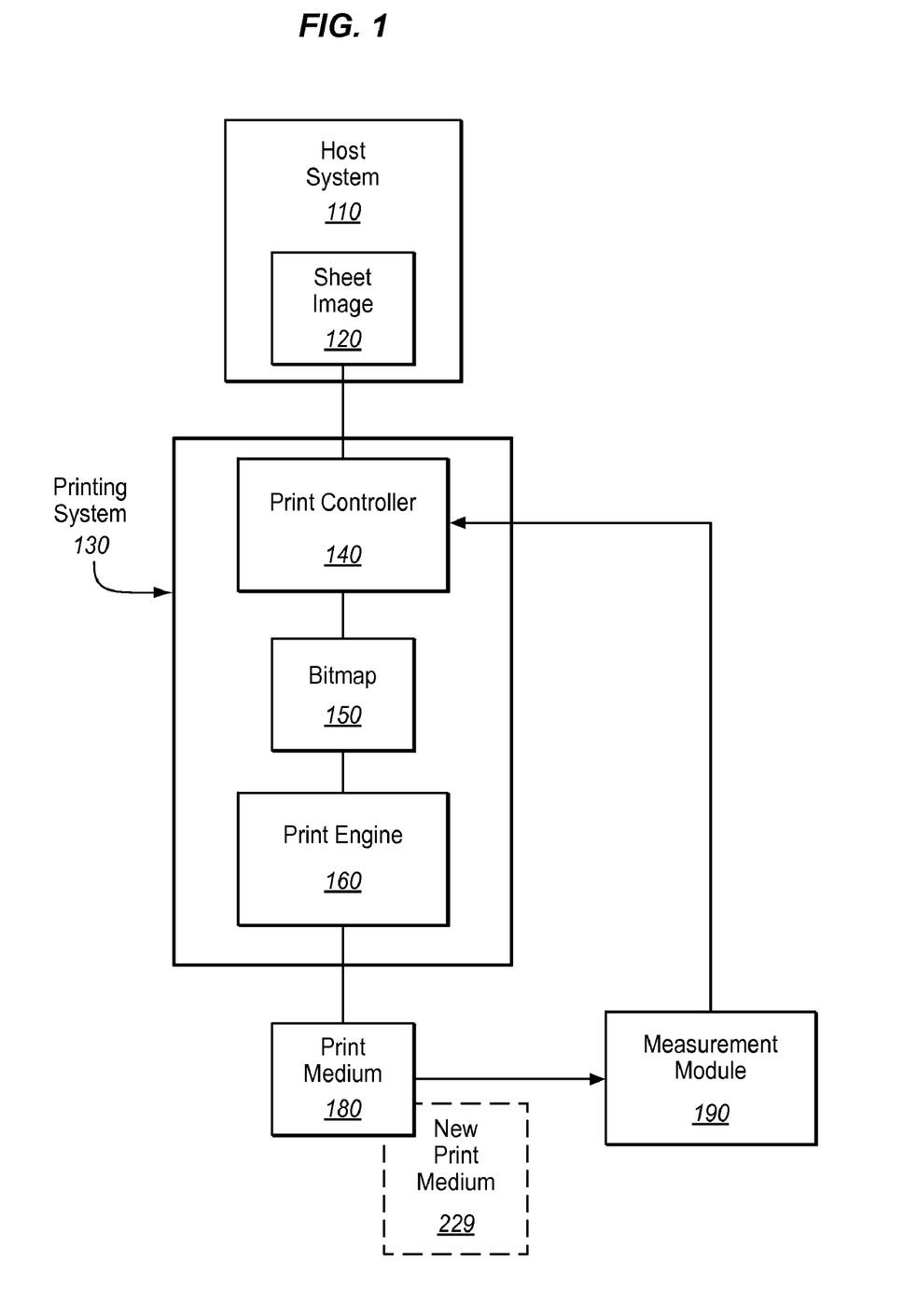
FIG. 1 is a block diagram illustrating a printing system in an exemplary embodiment.

FIG. 1 is a block diagram illustrating a printing system 130 in an exemplary embodiment. A host system 110 is in communication with the printing system 130 to print a sheet image 120 onto a print medium 180 (e.g., paper) via a print engine 160. The resulting print medium 180 may be printed (e.g., via toner, ink, etc.) in color (e.g., Cyan, Magenta, Yellow, and Black, or "CMYK") and/or in any of a number of gray shades, including black and white. The host system 110 may comprise any computing device, such as a personal computer, a server, or even a digital imaging device, such as a digital camera or a scanner. The sheet image 120 may be any file or data that describes how an image on a sheet of print medium 180 should be printed. For example, the sheet image 120 may be described using a number of different Page Description Languages including PostScript data, Printer Command Language (PCL) data, AFP, and/or any other printer language data. The print controller 140 processes the sheet image after calibration, employing halftoning, to generate a bitmap 150 for printing to the print medium 180 via the print engine 160. The printing system 130 is a high-speed printing system operable to print relatively high volumes (e.g., greater than 100 pages per minute). The print medium 180 may be continuous form paper, cut sheet paper, and/or any other tangible medium suitable for printing.

Figure 2:
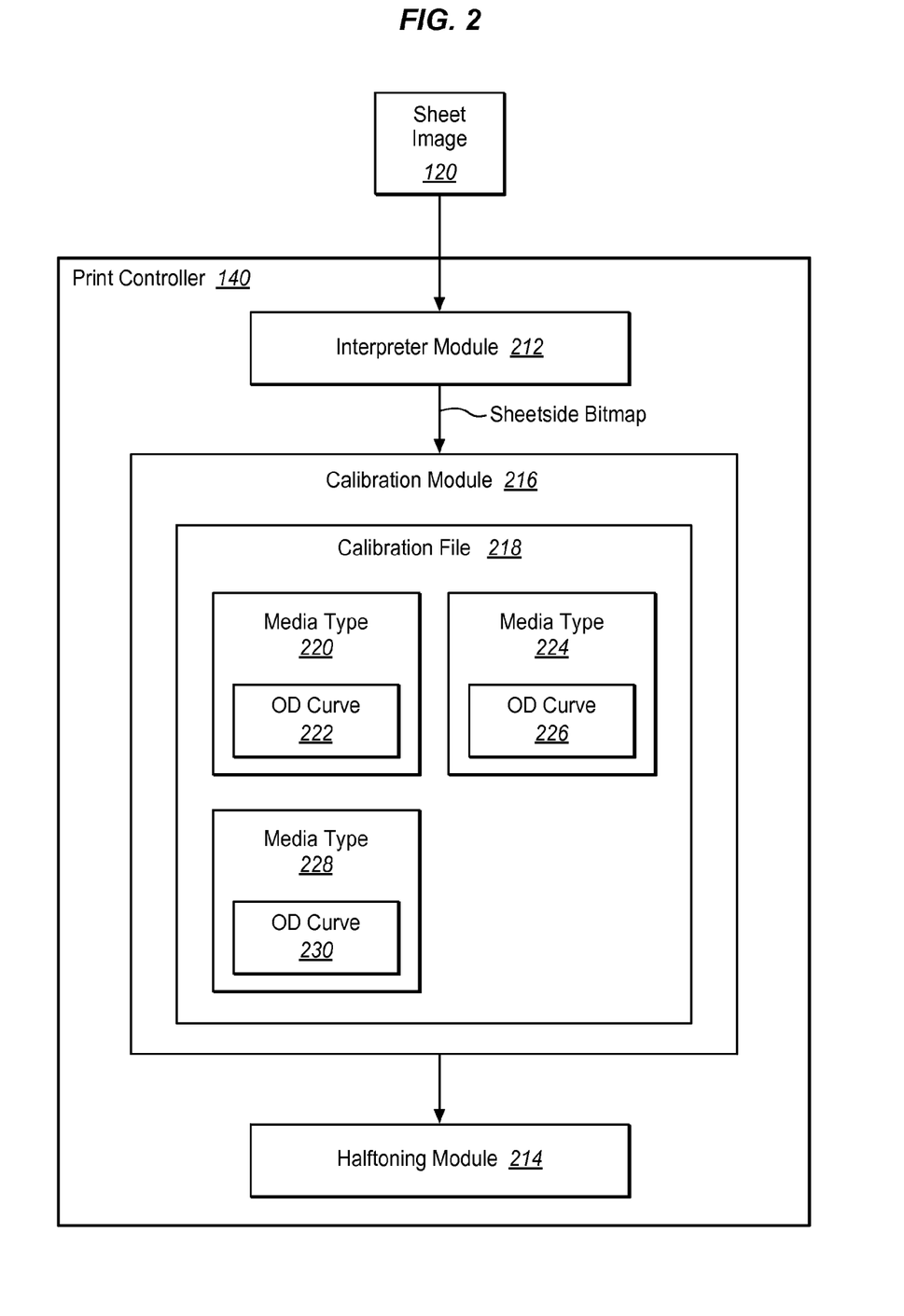
FIG. 2 is a block diagram illustrating a print controller in an exemplary embodiment.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. FIG. 2 is a block diagram illustrating an exemplary print controller 140. The print controller 140, in its generalized form, includes an interpreter module 212, a halftoning module 214, and a calibration module 216. These separate components may represent hardware used to implement the print controller 140. Alternatively or additionally, the separate components may represent logical blocks implemented by executing software instructions in a processor of the print controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a 2-dimensional array of pixels representing an image of the print job (i.e., a CTI), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to convert the calibrated sheetside bitmaps as halftone patterns of toner or ink. For example, the halftoning module 214 may convert the pixels to halftone patterns of CMYK toner or ink for application to the paper. Once computed, the halftoning module 214 transfers the converted sheetside bitmaps to the print engine 160 to apply the toner or ink to the paper. The print controller 140 may further include other modules such as a print job storage system, a raw data preprocessing system, and a bitmap processing system, etc.

The calibration module 216 comprises hardware, software, firmware, or any combination thereof, that is operable to calibrate the print engine 160 for a particular print medium type using determined optical density curves 222, 226, 230 . . . of other different print medium types 220, 224, 228 . . . respectively. To assist in the calibration, a measurement module 190 may be used to detect colors printed to various print mediums, as shown in FIG. 1. For example, the measurement module 190 may be an optical densitometer or a spectrophotometer that measures colors on the print medium 180 for use in calibrating the print engine 160 to the new print medium 180.

Figure 3:
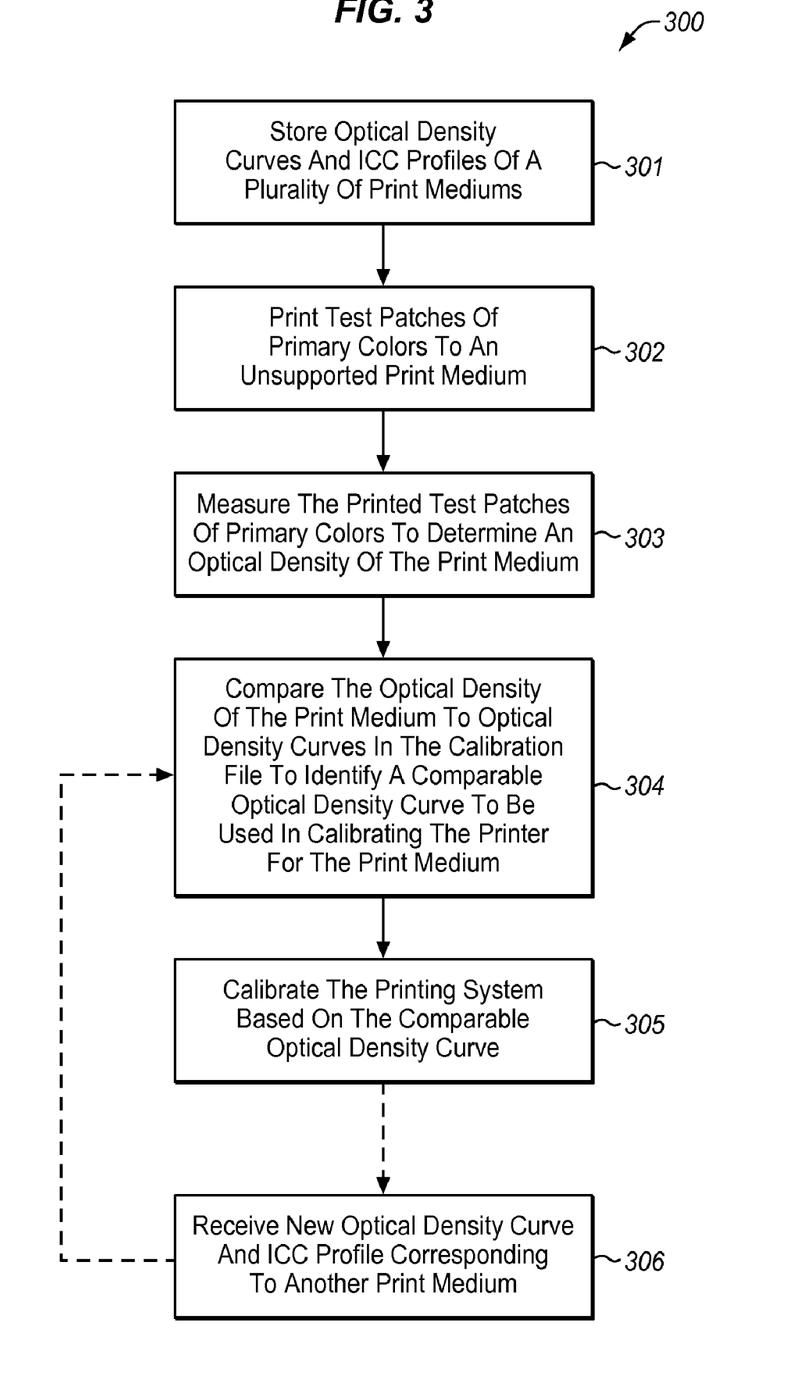
FIG. 3 is a flow chart illustrating a general method of printer calibration for a new print medium type in an exemplary embodiment.

FIG. 3 is a flow chart illustrating one exemplary process 300 for calibrating the print engine 160. In this embodiment, the process may begin at the manufacture of the printing system 130 where the calibration module 216 is first configured with a calibration file 218 that is representative of several different types of print media. For example, the printing system 130 may have multiple paper types loaded at any given time. Printing to these loaded papers may be switched as desired. To do so, the calibration module 216 may simply calibrate the print engine 160 for each known paper type and generate the calibration file 216 to recalibrate the print engine 160 to a particular paper type as needed.

Figure 4:
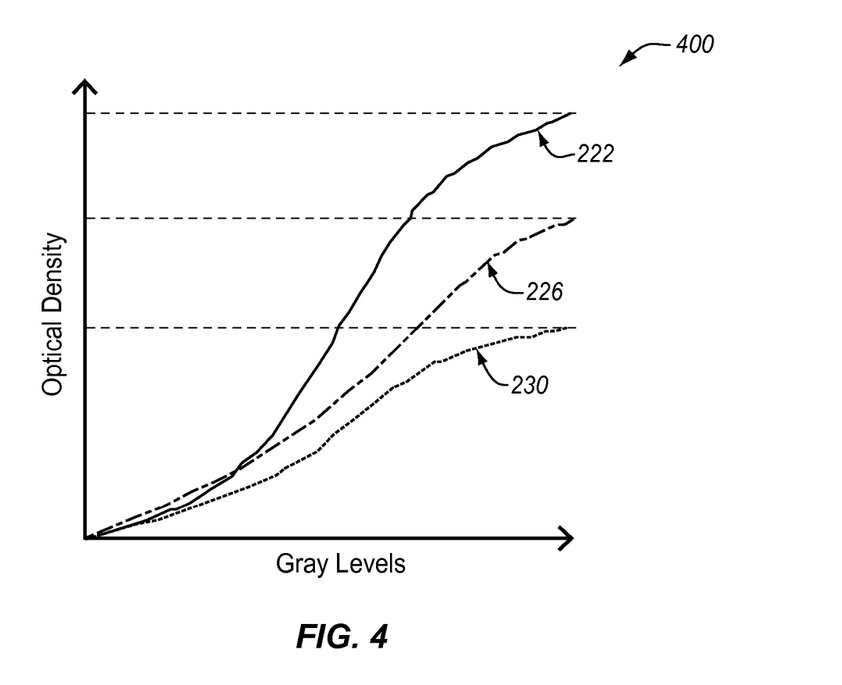
FIGS. 4-6 illustrate exemplary optical density graphs used in printer calibration.

To generate the calibration file 218, known types of media that the print engine 160 is likely to print are evaluated and the optical density curves of those print medium types are generated. The optical density curves are later used to calibrate the print engine 160 to one of those print medium types when printing on that particular print medium. For example, the calibration file 218 may include the optical density curves 222, 226, 230 . . . of the print medium types 220, 224, 228, as illustrated in graph 400 of FIG. 4. Each of these optical density curves 222, 226, 230 . . . is also associated with an ICC profile for the respective print medium type. The print engine 160 may therefore be calibrated to one particular print medium type 220 and thus one optical density curve 222 and ICC profile. Since the other optical density curves 226, 230 . . . and corresponding ICC profiles of the print medium types 224, 228 . . . are persistently stored with the calibration file 216, the print engine 160 can be quickly recalibrated to another of these known print medium types 224, 228 . . . (process element 301).

Traditionally, when a new print medium is to be supported by a printing system, the printing system would print test patches on the new print medium such that they may be measured by a measurement module. A calibration module would then process these measurements and generate a corresponding ICC profile for the new print medium, resulting in loss of production and other associated problems as mentioned above. In this embodiment, the printing system 130 also prints test patches consisting primary colors to the new unsupported print medium 180, in the process element 302, where they are measured by the measurement module 190, in the process element 303 to determine an optical density of the print medium 180. Once measured, however, the calibration module 216 compares the optical density of the print medium 180 to the optical density curves 222, 226, 230 . . . of the calibration file 218, in the process element 304, to determine a comparable optical density curve to be used in calibrating the print engine for the new print medium 229. In doing so, the calibration module 216 may select an optical density curve having less maximum optical density than that of the new print medium 229.

Once the comparable optical density curve is selected, the calibration module 216 may automatically calibrate the print engine 160, in the process element 305. For example, the calibration module 216 may create a new set of calibrated halftone screens for the new print medium matching characteristics of one of the existing print medium types 220, 224, 228 . . . . These characteristics may include the maximum optical density and/or the optical density curve. Once the calibrated halftone screens are created for the new print medium, the ICC profile associated with the selected print medium type may be used for the new print medium 229 in combination with the associated calibrated halftones. When printing to the original medium types, the original halftones are used.

Figure 5:
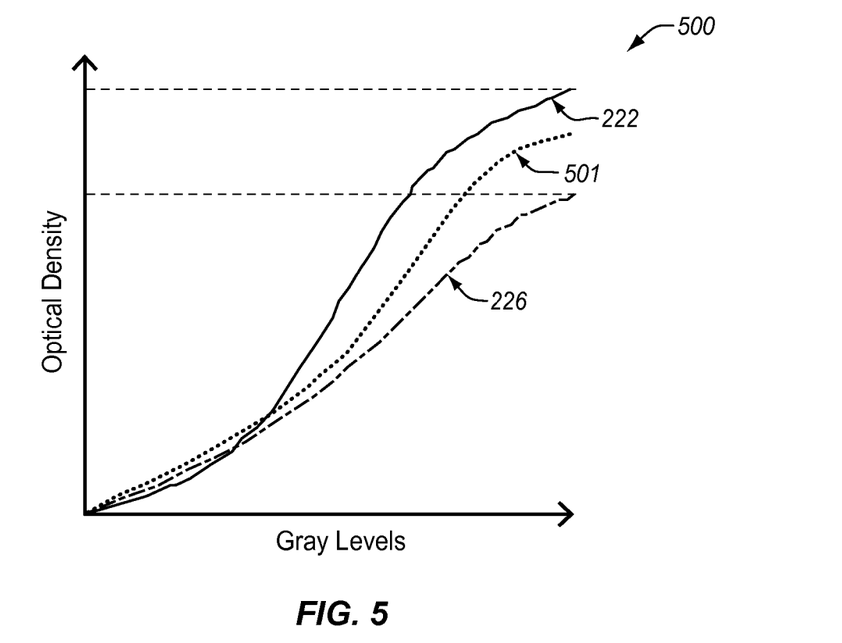

While the new calibrated halftone screens for the new medium type may be less accurate than using a new ICC profile generated specifically for that medium, such is not necessarily a concern for high-speed production printers because the processing speed of print jobs is generally more important than color accuracy when printing those print jobs. However, to reduce errors, the ICC profiles for the closest matching print medium type may be selected among multiple ICC profiles. As such, the target optical density curve may include the reference characteristic of the selected print medium type of a theoretical target curve (e.g., sigmoidal). For example, the calibration module 218 may calibrate halftone screens for each color on the print medium 229 to a given maximum optical density and reference density curve (e.g., L* or other) associated to a reference ICC profile. In graph 500 of FIG. 5, an optical density curve 501 of the new print medium 229 is compared to the optical density curves 222 and 226 of the print medium types 220 and 224. The calibration module 218 may then calibrate the halftone screens to simulate the shape of the OD curve for the print medium type 226 because it has a lower maximum optical density than the maximum optical density of the print medium 180 and the optical density curve 222 of the print medium type 220. This selection is made because calibrated halftones can be designed to achieve lower OD but not higher OD.

Figure 6:
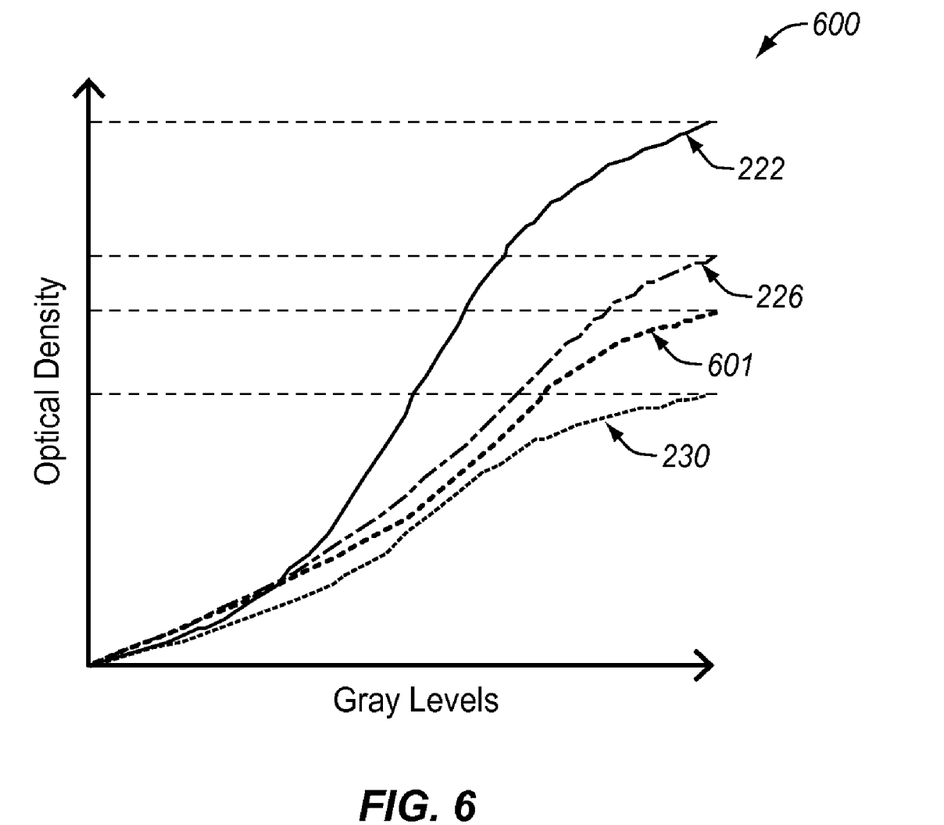

Additionally, when a new print medium type is added (i.e., the optical density curve and ICC profile) to the calibration file 218, the calibration module 216 may automatically re-categorize the print mediums. For example, when a new print medium type with the optical density curve 601 is received by the calibration module 216 in the process element 306, the calibration module 216 automatically re-categorizes the print medium types according to maximum optical densities, as shown in graph 600 of FIG. 6. Thus, if the maximum optical density of the curve 601 is lower than that of the print medium type 226 and the print medium 229, then the calibration module 216 automatically recalibrates the print engine 160 to the optical density curve 601 of the new print medium type (i.e., the process elements 304, 305, 306).

Figure 7:
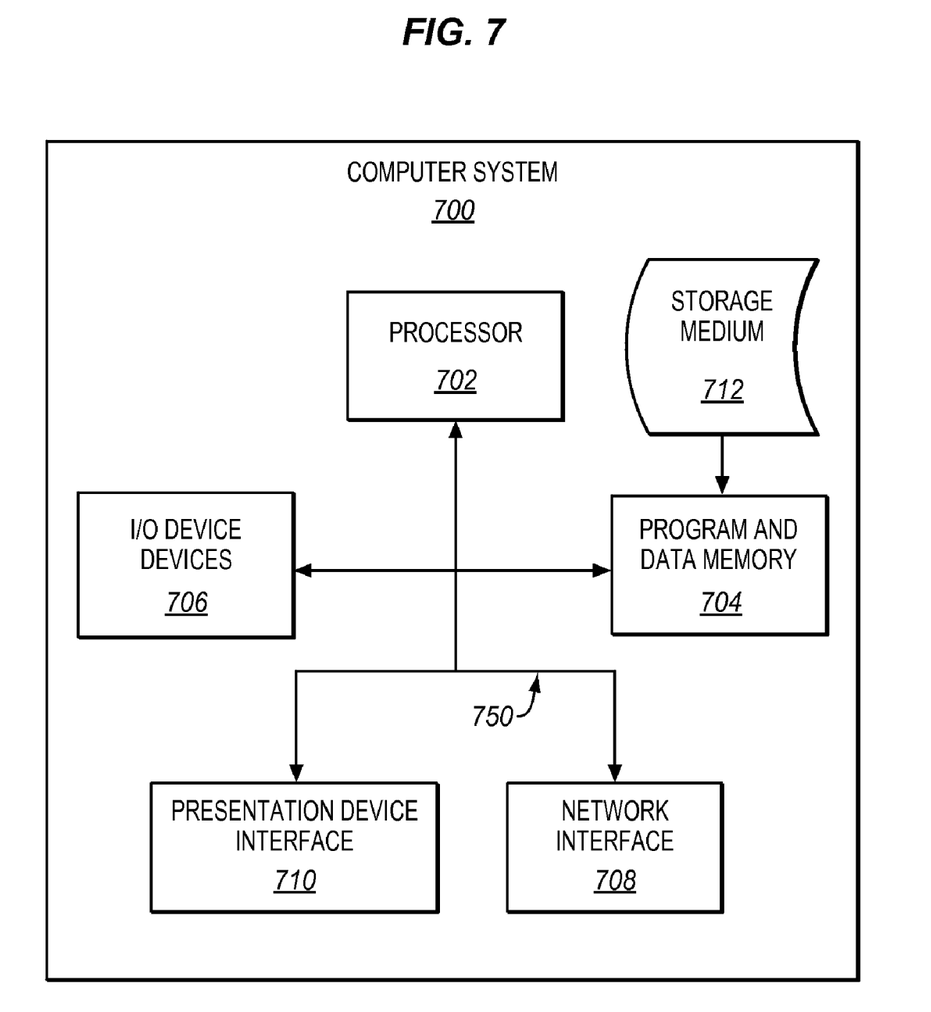
FIG. 7 illustrates a computer system operable to execute computer readable medium embodying programmed instructions to perform desired functions in an exemplary embodiment.

As mentioned, embodiments disclosed herein can take the form of software, hardware, firmware, or various combinations thereof. In one particular embodiment, software is used to direct the processor of the print controller 140 to perform the various operations disclosed herein. FIG. 7 is a block diagram depicting a computer system 700 also operable to provide the above features by executing programmed instructions and accessing data stored on a computer readable storage medium 712. In this regard, embodiments of the invention can take the form of a computer program accessible via the computer-readable medium 712 providing program code for use by a computer or any other instruction execution system. For the purposes of this description, a computer readable medium 712 can be anything that can contain, store, communicate, or transport the program for use by the computer or other instruction execution system.

The computer readable medium 712 can be an electronic, magnetic, optical, electromagnetic, infrared, or semiconductor device. Examples of the computer readable medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The computer system 700, being suitable for storing and/or executing the program code, includes at least one processor 702 coupled to memory elements 704 through a system bus 750. The memory elements 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc) can be coupled to the system either directly or through intervening I/O controllers. Network adapter interfaces 708 may also be coupled to the system to enable the computer system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 710 may be coupled to the system to interface to one or more presentation devices, such as printing systems and displays for presentation of presentation data generated by processor 702.

In one embodiment, the calibration may be implemented as software instructions operable with a host system (or other computer systems) as opposed to being performed with the print controller to perform calibration. For example, software instructions may direct a processing system, such as a general purpose computer, to generate the halftone screen and transfer it to the print controller for printing via the print engine. Thus, although claimed and described with respect to a print controller, such designations are merely intended to describe the general calibration that may have been traditionally performed by a print controller. Accordingly, while specific embodiments were described herein, the scope of the invention is not limited to those specific embodiments. The scope of the invention is defined by the following claims and any equivalents thereof.

We claim:

1. A method of calibrating a high-speed production printing system, the method comprising:
   printing test patches of primary colors on a first print medium;
   measuring colors of the test patches printed on the first print medium to determine an optical density of the first print medium;
   comparing the optical density of the first print medium to a plurality of optical density curves to identify a comparable optical density curve of a different print medium, wherein the comparable optical density curve is one of a plurality of optical density curves installed on the production printing system; and
   calibrating the production printing system based on the comparable optical density curve for use in printing to the first print medium.

2. The method of claim 1, further comprising:
   selecting a color profile associated with the different print medium; and
   directing the production printing system to print to the first print medium based on the selected color profile.

3. The method of claim 2, wherein the color profile is an International Color Consortium (ICC) color profile.

4. The method of claim 1, further comprising:
   receiving a new optical density curve and a new color profile corresponding to another different print medium; and
   automatically calibrating the production printing system based on the new optical density curve.

5. The method of claim 4, wherein the new color profile is an International Color Consortium (ICC) color profile.

6. The method of claim 1, further comprising:
   selecting the comparable optical density curve according to an optical density of the corresponding print medium, wherein the comparable optical density curve has less maximum optical density than the first print medium.

7. A high-speed production printing system, comprising:
   a print engine operable to print image data of a print job on a first print medium;
   a storage module operable to store a plurality of optical density curves corresponding to a plurality of print mediums, wherein the print mediums differ from the first print medium and wherein each optical density curve is operable to calibrate the printing system to convert color values of the image data to a color space of the printing system based on a corresponding print medium;
   a measurement module operable to measure color values of primary color test patches printed on the first print medium and determine optical density values of the first print medium; and
   a calibration module operable to compare the optical density values of the first print medium to the optical density curves of the storage module, select a comparable optical density curve from the plurality of optical density curves, and automatically calibrate the printing system based on the comparable optical density curve.

8. The production printing system of claim 7, wherein the calibration module is further operable to select a color profile associated with the comparable optical density curve and direct the print engine to print to the first print medium based on the selected color profile.

9. The method of claim 8, wherein the color profile is an International Color Consortium (ICC) color profile.

10. The production printing system of claim 7, wherein the calibration module is further operable to receive a new optical density curve and a new color profile corresponding to another different print medium and automatically calibrate the print engine based on the new optical density curve.

11. The method of claim 10, wherein the new color profile is an International Color Consortium (ICC) color profile.

12. The production printing system of claim 7, wherein the calibration module is further operable to select the comparable optical density curve by determining which of the plurality of optical density curves has less maximum optical density than the first print medium.

13. A computer readable medium operable to store software instructions for calibrating a high-speed production printing system to a plurality of different paper types, wherein the software instructions are configured to direct a print controller of the production printing system to:
- print test patches of primary colors on a first print medium;
- measure colors of the test patches printed on the first print medium to determine an optical density of the first print medium;
- compare the optical density of the first print medium to a plurality of optical density curves to identify a comparable optical density curve of a different print medium, wherein the comparable optical density curve is one of a plurality of optical density curves installed on the production printing system; and
- calibrate the production printing system based on the comparable optical density curve for use in printing to the first print medium.

14. The computer readable medium of claim 13, wherein the software instructions are further configured to direct the print controller to:
- select a color profile associated with the different print medium; and
- direct the production printing system to print to the first print medium based on the selected color profile.

15. The method of claim 14, wherein the color profile is an International Color Consortium (ICC) color profile.

16. The computer readable medium of claim 13, wherein the software instructions are further configured to direct the print controller to:
- receive a new optical density curve and a new color profile corresponding to another different print medium; and
- automatically calibrate the production printing system based on the new optical density curve.

17. The method of claim 13, wherein the new color profile is an International Color Consortium (ICC) color profile.

18. The computer readable medium of claim 17, wherein the software instructions are further configured to direct the print controller to:
- select the comparable optical density curve according to an optical density of the corresponding print medium, wherein the comparable optical density curve has less maximum optical density than the first print medium.

* * * * *